(12) United States Patent
Li et al.

(10) Patent No.: US 10,979,194 B2
(45) Date of Patent: Apr. 13, 2021

(54) RESOURCE INDICATION METHOD, USER EQUIPMENT, AND NETWORK DEVICE

(71) Applicant: Huawei Technologies Co., Ltd., Shenzhen (CN)

(72) Inventors: Junchao Li, Shanghai (CN); Ning Wu, Shanghai (CN); Hao Tang, Shanghai (CN); Xinxian Li, Shanghai (CN); Zhongfeng Li, Munich (DE)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/504,024

(22) Filed: Jul. 5, 2019

(65) Prior Publication Data

US 2019/0334680 A1 Oct. 31, 2019

Related U.S. Application Data

(63) Continuation of application No. PCT/CN2017/120281, filed on Dec. 29, 2017.

(30) Foreign Application Priority Data

Jan. 6, 2017 (CN) .......................... 201710010466.3

(51) Int. Cl.
*H04L 5/00* (2006.01)
*H04W 72/04* (2009.01)
*H04W 74/00* (2009.01)

(52) U.S. Cl.
CPC ....... *H04L 5/0051* (2013.01); *H04W 72/0446* (2013.01); *H04W 72/0453* (2013.01); *H04W 74/006* (2013.01)

(58) Field of Classification Search
CPC ... H04L 5/0051; H04L 5/0007; H04L 5/0091; H04L 5/0053; H04W 72/0446;
(Continued)

(56) References Cited

U.S. PATENT DOCUMENTS

2015/0256308 A1* 9/2015 Ma ...................... H04W 72/042
370/330
2016/0156492 A1* 6/2016 Martinez ............. H04L 27/2655
375/340
(Continued)

FOREIGN PATENT DOCUMENTS

CN 104685847 A 6/2015
CN 105359474 2/2016
(Continued)

OTHER PUBLICATIONS

R1-1613023; 3GPP TSG-RAN WG1 #87 Reno, NV, USA, Nov. 14-18, 2016; Nokia et al.; "On the transmission DL control information and data using different nunnerologies" (Year: 2016).*
(Continued)

*Primary Examiner* — Benjamin H Elliott, IV
(74) *Attorney, Agent, or Firm* — Slater Matsil, LLP

(57) ABSTRACT

A resource indication method, a user equipment and a network device is disclosed. In an embodiment a method includes receiving, by user equipment, configuration information sent by a network device, wherein the configuration information comprises allocation information of frequency domain resources of a plurality of first system parameters and transmitting, by the user equipment, information corresponding to a physical channel and/or information corresponding to a physical signal on at least one resource element in a time-frequency resource corresponding to a frequency domain resource of at least one of the plurality of first system parameters, wherein the first system parameter comprises a first subcarrier spacing size, a cyclic prefix length, a transmission time interval length, a symbol length, or a symbol quantity.

20 Claims, 11 Drawing Sheets

(58) Field of Classification Search
CPC ........... H04W 72/0453; H04W 74/006; H04W 72/00; H04W 72/04; H04W 72/0493
See application file for complete search history.

(56) References Cited

U.S. PATENT DOCUMENTS

| | | | |
|---|---|---|---|
| 2016/0219498 A1* | 7/2016 | Abraham | H04W 72/0446 |
| 2016/0352551 A1* | 12/2016 | Zhang | H04L 5/0007 |
| 2016/0360550 A1* | 12/2016 | Chen | H04L 5/1469 |
| 2018/0007658 A1 | 1/2018 | Shen et al. | |
| 2018/0049169 A1* | 2/2018 | Lin | H04L 5/0051 |
| 2018/0098312 A1* | 4/2018 | Lin | H04L 1/1861 |
| 2019/0149309 A1* | 5/2019 | Kuang | H04L 5/0037 370/329 |
| 2019/0208482 A1* | 7/2019 | Tooher | H04L 27/2628 |
| 2019/0306860 A1* | 10/2019 | Ciochina | H04W 72/0406 |
| 2019/0334680 A1* | 10/2019 | Li | H04L 5/0051 |

FOREIGN PATENT DOCUMENTS

| | | | |
|---|---|---|---|
| CN | 106304138 A | 1/2017 | |
| EP | 3435712 A1 | 1/2019 | |
| WO | 2015109609 A1 | 7/2015 | |
| WO | 2016004900 A1 | 1/2016 | |
| WO | 2016107520 A1 | 7/2016 | |
| WO | 2016114824 A1 | 7/2016 | |
| WO | 2016130175 A1 | 8/2016 | |
| WO | WO-2018112933 A1 * | 6/2018 | ............ H04W 88/06 |

OTHER PUBLICATIONS

English translation of WO2018/112933, retrieved from the Internet on Jul. 29, 2020 via WIPO translator and Google translator (Year: 2020).*
International search report (ISR) of PCT/CN2017/120281; dated Jul. 9, 2019 (Year: 2019).*
AT&T, et al., "WF on Spectrum Partitioning with Mixed Numerology", 3GPP TSG RAN WG1 Meeting #87, R1-1613521, Reno, USA, Nov. 14-18, 2016, 9 pages.
AT&T, "Resource Partitioning with Mixed Numerology", 3GPP TSG-RAN WG1 #87, R1-1612363, Reno, USA, Nov. 14, 18, 2016, 4 pages.
Oppo, "Logical channel multiplexing and prioritization in NR", 3GPP TSG-RAN WG2 Ad Hoc, R2-1700049, Spokane, USA, Jan. 17-19, 2017, 4 pages.
Interdigital Communications, "UE Support for Multiple Numerologies with NR", 3GPP TSG-RAN WG1 #86, R1-167328, Goteborg, Sweden, Aug. 22-26, 2016, 4 pages.
LG Electronics, "Discussion on frequency-alignment and resource block structure for different numerologies", 3GPP TSG-RAN WG1#86b, R1-1609234, Lisbon, Portugal, Oct. 10-14, 2016, 5 pages.

* cited by examiner

| Subset 0 (p = 0) | RBG 0 | RBG 2 | RBG 4 | RBG 6 | RBG 8 | RBG 10 | RBG 12 |
| Subset 1 (p = 1) | RBG 1 | RBG 3 | RBG 5 | RBG 7 | RBG 9 | RBG 11 | |

Downlink control information format

RESOURCE INDICATION METHOD, USER EQUIPMENT, AND NETWORK DEVICE

CROSS-REFERENCE TO RELATED APPLICATIONS

This application is a continuation of International Application No. PCT/CN2017/120281, filed on Dec. 29, 2017, which claims priority to Chinese Patent Application No. 201710010466.3, filed on Jan. 6, 2017. The disclosures of the aforementioned applications are hereby incorporated by reference in their entireties.

TECHNICAL FIELD

The present invention relates to the field of communications technologies, and specifically, to a resource indication method, user equipment, and a network device.

BACKGROUND

With the development of communications technologies, the 3rd Generation Partnership Project (3GPP) has formulated the fifth generation network (5G) new radio (NR) standard, and flexibly supporting a plurality of system parameters (numerology) is one of important features of the NR.

Different system parameters correspond to different subcarrier spacings in an orthogonal frequency division multiplexing (OFDM) system. Currently, the NR supports the subcarrier spacing such as $15*2^n$ kHz ($n \in \{-2, -1, \ldots 5\}$), which corresponds to a subcarrier spacing interval [3.75 kHz, 480 kHz]). Selection of the subcarrier spacing corresponding to the system parameter depends on a trade-off between spectral efficiency and an anti-frequency offset capability. For an OFDM system based on a cyclic prefix (CP), a symbol includes a symbol part and a CP part. For same CP overheads, a smaller subcarrier spacing indicates a longer symbol part, a longer OFDM symbol period, higher system spectral efficiency, and weaker capabilities of resisting Doppler frequency shift and phase noise.

In the NR, different services and different scenarios require different system parameters. The NR supports, on a segment of bandwidth, that a manner of frequency division multiplexing (FDM) and/or time division multiplexing (TDM) may be used to multiplex different system parameters. At the RAN1 #87 meeting, an agreed research focus was to dynamically multiplex a plurality of system parameters in a same segment of bandwidth.

Currently, a resource indication method provided in the Long Term Evolution (LTE) standard for each resource allocation type is applicable to a system parameter corresponding to a subcarrier spacing of 15 kHz. For example, for a downlink resource allocation type 2, a resource allocated to user equipment is a segment of consecutive virtual resource blocks (VRBs). A manner of mapping the VRB to a physical resource block (PRB) may be centralized, or may be distributed. The resource indication method for this resource allocation type is indicated by downlink control information (DCI). A bit in a DCI format is used to indicate that the mapping manner is centralized or distributed, and a resource indication bit in the DCI format is used to indicate a start resource block allocated to the user equipment and a length of consecutively allocated resource blocks.

However, a resource indication method for a system parameter corresponding to 15 kHz can indicate a resource allocation status in a single system parameter scenario, but cannot indicate a resource allocation status in a co-existence scenario of a plurality of system parameters.

SUMMARY

Embodiments provide a resource indication method, user equipment, and a network device, so as to indicate a resource allocation status in a co-existence scenario of a plurality of system parameters.

A first aspect of the embodiments of the present invention provides a resource allocation method, including sending, by a network device, configuration information to user equipment, where the configuration information includes allocation information of frequency domain resources of a plurality of first system parameters; receiving, by the user equipment, the configuration information sent by the network device, and transmitting information corresponding to a physical channel and/or information corresponding to a physical signal on at least one resource element in a time-frequency resource corresponding to a frequency domain resource of at least one of the plurality of first system parameters.

The first system parameter includes at least one of parameters such as a first subcarrier spacing size, a cyclic prefix length, a transmission time interval length, a symbol length, and a symbol quantity.

According to the first aspect of the embodiments of the present invention, the frequency domain resources of the plurality of first system parameters are indicated by using the configuration information, so that a resource allocation status in a co-existence scenario of the plurality of system parameters can be indicated.

In a possible implementation, before sending the configuration information to the user equipment, the network device allocates frequency domain resources to the plurality of first system parameters, to obtain allocation information of the frequency domain resources of the plurality of first system parameters, so that the network device sends the configuration information to the user equipment.

In a possible implementation, the frequency domain resource of the first system parameter is determined by allocation information of the frequency domain resource of the first system parameter, the first system parameter, and a second system parameter, and the second system parameter includes a second subcarrier spacing size. The user equipment may determine the frequency domain resource of the first system parameter based on the allocation information of the frequency domain resource of the first system parameter, the first system parameter, and the second system parameter. In other words, the user equipment determines a frequency domain resource that is allocated by the network device to the first system parameter, so that the user equipment subsequently uses the frequency domain resource.

In a possible implementation, the plurality of first system parameters are system parameters supported by the network device, and the second system parameter is a reference system parameter for dividing a system frequency domain resource.

In a possible implementation, the configuration information further includes an identifier of the second system parameter, and the identifier of the second system parameter is used to identify a reference system parameter for dividing a system frequency domain resource.

In a possible implementation, the configuration information further includes an identifier of the first system parameter, which is used to notify the user equipment of allocation information of frequency domain resources corresponding to all first system parameters, and establish a correspondence between the allocation information and the first system parameters.

In a possible implementation, the configuration information is common-level downlink control information, a cyclic redundancy check on the common-level downlink control information is scrambled by using a cell common identifier, or a frozen bit of the common-level downlink control information is the cell common identifier, so that the user equipment is descrambled or decoded by using the cell common identifier, so as to obtain allocation information of frequency domain resources corresponding to all first system parameters.

In a possible implementation, the configuration information is common-level downlink control information, a cyclic redundancy check on the common-level downlink control information is scrambled by using an identifier of the first system parameter, or a frozen bit of the common-level downlink control information is the identifier of the first system parameter, so that the user equipment performs descrambling or decoding by using the identifier of the first system parameter, so as to obtain allocation information of a frequency domain resource corresponding to a first system parameter supported by the user equipment. This may reduce a size of the common-level downlink control information, and reduce complexity of blind detection or decoding for the user equipment.

The configuration information is the common-level downlink control information, and may reduce signaling overheads to some extent.

In a possible implementation, the configuration information is higher layer signaling, and the higher layer signaling is carried in dedicated radio resource control signaling, a system message, a random access response message, a message 4, or a media access control element.

A second aspect of the embodiments of the present invention provides a method for mapping a virtual resource block to a physical resource block, including sending, by a network device, scheduling information to user equipment, where the scheduling information includes a first virtual resource block corresponding to at least one first system parameter and mapping indication information; and receiving, by the user equipment, the scheduling information sent by the network device, performing resource block mapping based on the scheduling information to obtain a physical resource block corresponding to at least one first system parameter, and transmitting information corresponding to a physical channel and/or information corresponding to a physical signal on the physical resource block.

According to the second aspect of the embodiments of the present invention, a mapping manner and a first virtual resource block corresponding to at least one first system parameter are indicated by using the scheduling information, so that the user equipment performs the resource block mapping based on the scheduling information, so as to indicate a resource allocation status in a co-existence scenario of a plurality of system parameters.

In a possible implementation, the first virtual resource block corresponding to the at least one first system parameter includes numbers of first virtual resource blocks corresponding to all first system parameters, so that the user equipment clearly knows the first virtual resource blocks corresponding to all the first system parameters.

In a possible implementation, if a mapping manner indicated by the mapping indication information is centralized mapping, the user equipment maps the first virtual resource blocks corresponding to all the first system parameters to corresponding physical resource blocks in the centralized mapping manner and based on the numbers of the first virtual resource blocks corresponding to all the first system parameters.

In a possible implementation, if a mapping manner indicated by the mapping indication information is new distributed mapping, the user equipment first maps the first virtual resource blocks corresponding to all the first system parameters to second virtual resource blocks in the distributed mapping manner, to be specific, $n_{VRB,2}=M(n_{VRB,1})$, where M represents the distributed mapping manner, including at least one of interleaving and frequency hopping between slots; $n^{VRB,1}$ represents a number of the first virtual resource block, ranging from 0 to $N_{VRB,1}-1$, $N_{VRB,1}=N_{RB}$, and $N_{RB}$ is a quantity of RBs occupied by a given first system parameter in frequency domain of a time-frequency resource. Then, the user equipment maps the second virtual resource blocks corresponding to all the first system parameters to physical resource blocks in the centralized mapping manner, to be specific, $n_{PRB}=N_{VRB,2}$.

A third aspect of the embodiments of the present invention provides user equipment, including a receiving unit, configured to receive configuration information sent by a network device, where the configuration information includes allocation information of frequency domain resources of a plurality of first system parameters and a sending unit, configured to transmit information corresponding to a physical channel and/or information corresponding to a physical signal on at least one resource element in a time-frequency resource corresponding to a frequency domain resource of at least one of the plurality of first system parameters, where the first system parameter includes at least one of parameters such as a first subcarrier spacing size, a cyclic prefix length, a transmission time interval length, a symbol length, and a symbol quantity.

The user equipment provided in the third aspect of the embodiments of the present invention is configured to implement a function performed by the user equipment in the resource indication method provided in the first aspect of the embodiments of the present invention.

A fourth aspect of the embodiments of the present invention provides a network device, including a sending unit, configured to send configuration information to a user equipment, where the configuration information includes allocation information of frequency domain resources of a plurality of first system parameters, at least one resource element in a time-frequency resource corresponding to a frequency domain resource of at least one of the plurality of first system parameters is used by the user equipment to transmit information corresponding to a physical channel and/or information corresponding to a physical signal, and the first system parameter includes at least one of parameters such as a first subcarrier spacing size, a cyclic prefix length, a transmission time interval length, a symbol length, and a symbol quantity.

The network device provided in the fourth aspect of the embodiments of the present invention is configured to implement a function performed by the network device in the resource indication method provided in the first aspect of the embodiments of the present invention.

A fifth aspect of the embodiments of the present invention provides another user equipment, including a processor and a communications module, where the user equipment is configured to implement a function performed by the user equipment in the resource indication method provided in the first aspect of the embodiments of the present invention.

A sixth aspect of the embodiments of the present invention provides another network device, including a processor and a transceiver, where the network device is configured to implement a function performed by the network device in the resource indication method provided in the first aspect of the embodiments of the present invention.

In the embodiments of the present invention, the network device sends, to the user equipment, the configuration information that includes the allocation information of the frequency domain resources of the plurality of first system parameters, so as to indicate the frequency domain resources corresponding to the plurality of first system parameters, so that the user equipment transmits the information corresponding to the physical channel and/or the information corresponding to the physical signal on at least one resource element of a time-frequency resource corresponding to a required frequency domain resource, and the resource allocation status in the co-existence scenario of the plurality of system parameters is indicated.

BRIEF DESCRIPTION OF THE DRAWINGS

To describe the technical solutions in the embodiments of the present invention more clearly, the following briefly describes the accompanying drawings required for describing the embodiments or the prior art. Apparently, the accompanying drawings in the following description show merely some embodiments of the present invention, and a person of ordinary skill in the art may derive other drawings from these accompanying drawings without creative efforts.

DETAILED DESCRIPTION OF ILLUSTRATIVE EMBODIMENTS

Figures 1, 1A:
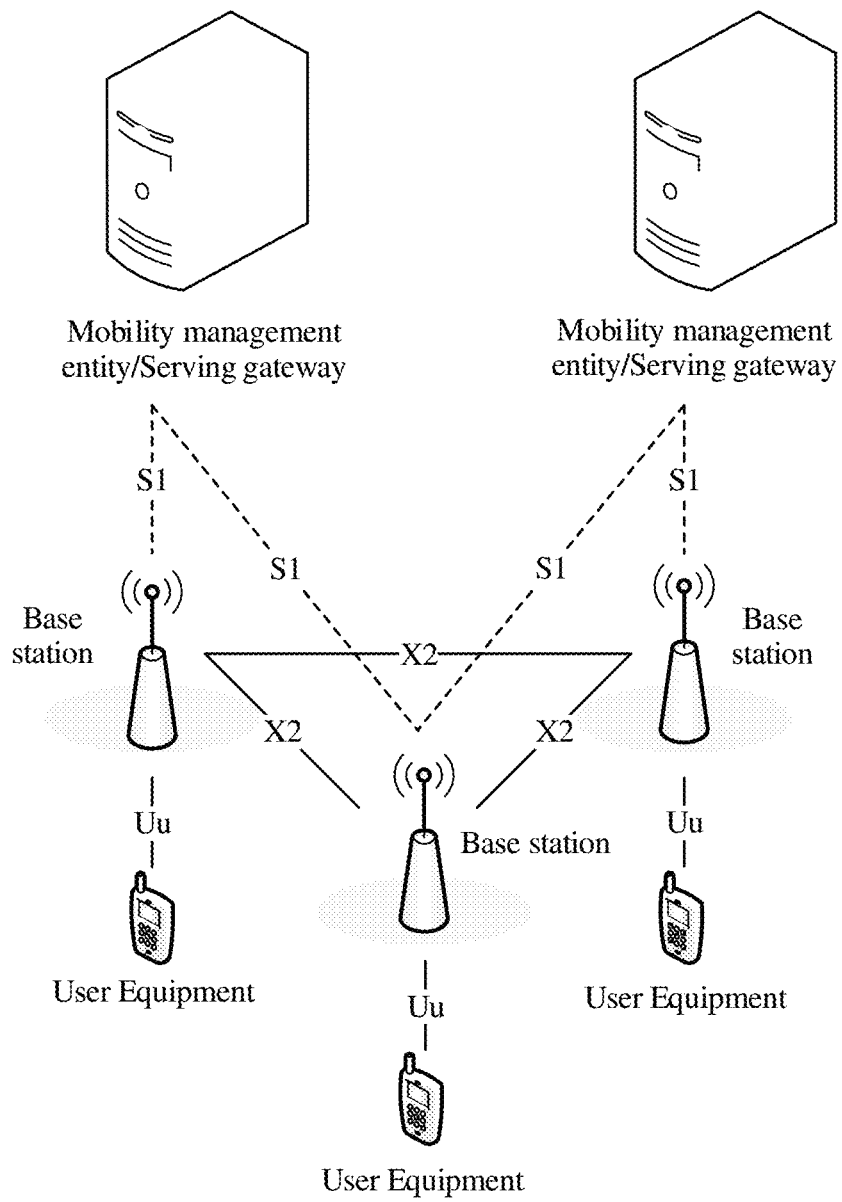
FIG. 1 is a schematic diagram of a network architecture to which an embodiment of the present invention is applied.
FIG. 1a is a schematic diagram of a subset of a resource block group in a downlink resource allocation type 1.

FIG. 1 is a schematic diagram of a network architecture to which an embodiment of the present invention is applied. The schematic diagram of the network architecture may be a network architecture in an LTE communications system, or may be a Universal Mobile Telecommunications System (UMTS) terrestrial radio access network (UTRAN) architecture, or a radio access network (GSM EDGE Radio Access Network, GERAN) architecture of a Global System for Mobile Communications (GSM)/Enhanced Data rates for GSM Evolution (EDGE) system, or may be a 5G communications system architecture. The schematic diagram of the network architecture includes a mobility management entity (MME)/serving gateway (S-GW), a base station, and user equipment (UE). It should be noted that, forms of and quantities of MMEs/SGWs, base stations, and UEs shown in FIG. 1 are used as an example for description, and do not constitute a limitation on the embodiments of the present invention.

The MME is a key control node in the 3GPP LTE, is a core network element, and is mainly responsible for a signaling processing part, namely, a control plane function, including functions such as access control, mobility management, attachment and detachment, session management function, and gateway selection. The SGW is an important network element of the core network element in the 3GPP LTE, and is mainly responsible for a user plane function of forwarding user data, to be specific, routing and forwarding a data packet under control of the MME.

The base station is configured to communicate with the user equipment, and may be a base transceiver station (BTS) in a GSM system or Code Division Multiple Access (CDMA), or may be a NodeB (NB) in a WCDMA system, or may be an evolved NodeB (eNB) in an LTE system, or may be a base station in a 5G system, or a base station in a future communications system. The base station is mainly responsible for functions, such as radio resource management, quality of service (QoS) management, and data compression and encryption on an air interface side. On a core network side, the base station is mainly responsible for forwarding control plane signaling to the MME and forwarding user plane service data to the SGW.

The user equipment is a device that accesses a network side by using the base station, and may include but is not limited to a cellular phone, a cordless phone, a Session Initiation Protocol (SIP) phone, a wireless local loop (WLL) station, a personal digital assistant (PDA), a handheld device having a wireless communication function, a computing device or another processing device connected to a wireless modem, an in-vehicle device, a wearable device, or a terminal device in a future 5G network.

An S1 interface shown in FIG. 1 is a standard interface between a base station and a core network. The base station is connected to the MME by using an S1-MME interface, which is used to transmit control signaling. The base station is connected to the SGW by using an S1-U interface, which is used to transmit user data. The S1-MME interface and the S1-U interface are collectively referred to as the S1 interface.

An X2 interface shown in FIG. 1 is a standard interface between base stations, and is used to implement intercommunication between base stations.

A Uu interface shown in FIG. 1 is a standard interface between user equipment and a base station, and the user equipment accesses an LTE/5G network by using the Uu interface.

The following explains terms used in the embodiments of the present invention.

(1) A virtual resource block is used during scheduling at a media access control (MAC) layer, and belongs to a logical concept.

(2) A physical resource block needs to be used during actual mapping at a physical layer, and belongs to a concept in an actual physical sense.

(3) A system parameter is a possible name of numerology, and does not constitute a limitation on the embodiments of the present invention. It may be understood that, another name of the numerology in a standard or a protocol may also fall within the protection scope of the embodiments of the present invention.

In the LTE standard, downlink resource allocation includes three resource allocation types 0 to 2, and the three resource allocation types are corresponding to three resource indication methods. Details are as follows:

(1) In a downlink resource allocation type 0, a downlink control information (DCI) format 1/2/2A/2B/2C indicates, by using a bitmap, a resource block group (RBG) allocated to UE. The bitmap includes $N_{RBG}=\lceil N_{RB}^{DL}/P \rceil$ bits in total, where $N_{RB}^{DL}$ represents a downlink bandwidth, P represents a size of the RBG, and $N_{RBG}$ represents a quantity of bits included in the bitmap and a quantity of RBGs as well. In other words, each bit is corresponding to one RBG. An RBG 0 represents a most significant bit, an RBG $N_{RBG}-1$ represents a least significant bit, and the rest is deduced by analogy. If an RBG is allocated to UE, a corresponding bit in the bitmap is set to 1; If an RBG is not allocated to UE, the bit is set to 0. The resource allocation type 0 supports allocation of nonconsecutive RBs in frequency domain.

(2) In a downlink resource allocation type 1, all RBGs are classified into P subsets, where P is a size of the RBG. Each RBG subset p (0≤p≤P) includes all RBGs that start from an RBG p and have a spacing of p. A virtual resource block (VRB) allocated to UE needs to come from a same subset. As shown in FIG. 1a, 25 RBs are classified into two subsets (a subset 0 and a subset 1). The subset 0 includes all RBGs that start from an RBG 0 and have a spacing of 2. The subset 1 includes all RBGs that start from an RBG 1 and have a spacing of 2.

In the resource allocation type 1, the DCI format 1/2/2A/2B/2C indicates, by using three fields, a VRB allocated to UE (Note: A VRB instead of an RBG is used here, unlike the resource allocation type 0). The resource allocation type 1 supports allocation of nonconsecutive RBs in frequency domain.

(3) In a downlink resource allocation type 2, a resource allocated to UE is a segment of consecutive VRBs, and the VRBs may be centralized or distributed. For a DCI format 1A/1B/1D, there is a bit (corresponding to a centralized/distributed VRB allocation identification field) used to indicate whether to use the centralized VRBs (the bit is 0) or the distributed VRBs. For the DCI format 1A/1B/1D, resource allocation is indicated by a resource indicator value (RIV). By using the value, a start RB ($RB_{start}$) allocated to the UE and a length ($L_{CRBs}$) of consecutively allocated RBs can be deduced. The resource allocation type 2 supports allocation of consecutive VRBs only.

Correspondingly, uplink resource allocation includes two resource allocation types 0 and 1, and the two resource allocation types are corresponding to two resource indication methods. Details are as follows:

(1) Processing of an uplink resource allocation type 0 is basically the same as that of the downlink resource allocation type 2 of the DCI format 1A/1B/1D, but uplink data transmission uses an uplink system bandwidth $N_{RB}^{UL}$ for calculation, instead of the downlink system bandwidth $N_{RB}^{DL}$.

(2) In an uplink resource allocation type 1, resource allocation information indicates that two RB sets are allocated to UE, and each set includes one or more consecutive RBGs with a size of P. P represents a quantity of consecutive RBs included in an RBG. In a DCI format 0/4, a resource block assignment field represents a combinatorial index r. r designates an index $s_0$ of a start RBG and an index $s_1-1$ of an end RBG in an RB set 1, and an index $s_2$ of a start RBG and an index $s_3-1$ of an end RBG in an RB set 2.

All the foregoing resource allocation types and resource indication methods are applicable to a system parameter corresponding to a subcarrier spacing of 15 kHz. However, indication cannot be performed in a co-existence scenario of a plurality of system parameters.

In view of this, the embodiments of the present invention provide a resource indication method, user equipment, and a network device, which are applicable to the co-existence scenario of the plurality of system parameters, and can indicate a resource allocation status in the co-existence scenario of the plurality of system parameters.

The user equipment in the embodiments of the present invention may include but is not limited to a cellular phone, a cordless phone, a handheld device having a wireless communication function, a computing device, or another processing device connected to a wireless modem, an in-vehicle device, a wearable device, or a terminal device in a future 5G network. The network device in the embodiments of the present invention may be a base station or a core network element in the schematic diagram of the network architecture shown in FIG. 1.

The following describes in detail the resource indication method, the user equipment, and the network device provided in the embodiments of the present invention.

Figure 2:
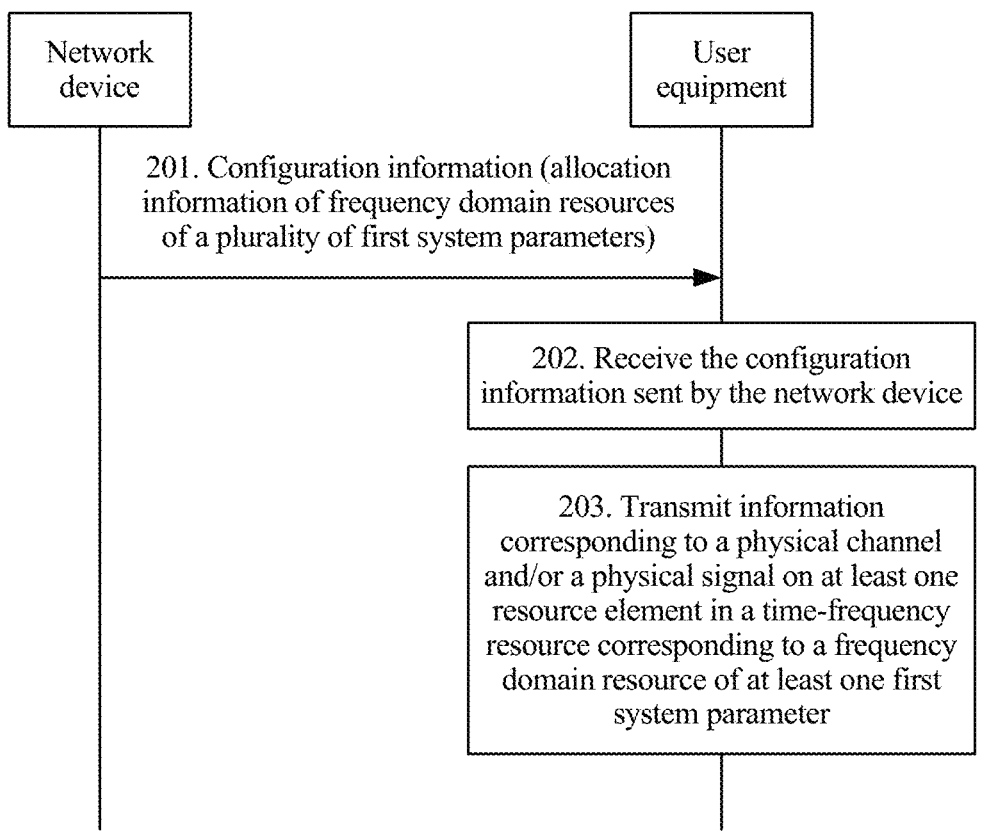
FIG. 2 is a schematic communication diagram of a resource indication method according to an embodiment of the present invention.

FIG. 2 is a schematic communication diagram of a resource indication method according to an embodiment of the present invention. The method includes step 201 to step 203.

201. A network device sends configuration information to user equipment, where the configuration information includes allocation information of frequency domain resources of a plurality of first system parameters.

The plurality of first system parameters are system parameters supported by the network device, and any one of the plurality of first system parameters includes at least one of a subcarrier spacing size, a cyclic prefix CP type, or a symbol quantity corresponding to a time unit type. The CP type is determined based on CP overheads, and the time unit type may be a subframe in an LTE system, or a slot, a mini-slot, an aggregated slot, and an aggregated mini-slot in an NR system. A symbol includes a symbol part and a CP part. In the case of the same CP overheads, a smaller subcarrier spacing indicates a longer symbol part, to be specific, a larger symbol quantity corresponding to the time unit type. It may be understood that, the subcarrier spacing size, the CP type, and the symbol quantity corresponding to the time unit type are three elements of a system parameter, and any one element can reflect the system parameter. Currently, a subcarrier spacing size supported by the NR may be $15*2^n$ kHz (n∈{-2, -1, ..., 5}, corresponding to a subcarrier spacing interval [3.75 kHz, 480 kHz]). In this embodiment of the present invention, a value range of n may not be limited to a range from −2 to 5.

It should be noted that, in an example of the subcarrier spacing size, the plurality of first system parameters may include a plurality of different subcarrier spacing sizes, such as 15 kHz and 30 kHz, or may include two or more same subcarrier spacing sizes, such as two 15 kHz subcarrier spacings.

Optionally, before sending the configuration information to the user equipment, the network device allocates frequency domain resources to the plurality of first system parameters, to obtain allocation information of the frequency domain resources of the plurality of first system parameters. A specific method for allocating, by the network device, the frequency domain resources to the plurality of first system parameters is not limited herein, and the allocation method is determined by the network device. During an allocation process, a same frequency domain resource may be allocated to two or more first system parameters, or different frequency domain resources may be allocated to the plurality of first system parameters.

During the allocation process, the network device may divide a system frequency domain resource (system bandwidth) based on a reference system parameter, and in this embodiment of the present invention, the reference system parameter is named a second system parameter. The second system parameter includes a subcarrier spacing size. The subcarrier spacing size of the second system parameter may be a default, or may be autonomously set by the network device, and a specific value is one of $15*2^n$ kHz. An identifier of the second system parameter may be notified to the user equipment. To be specific, the subcarrier spacing size of the second system parameter is notified. If the subcarrier spacing size is the default subcarrier spacing size, the network device does not notify the user equipment of the default subcarrier spacing size, because the default subcarrier spacing size may be predefined and learned by default by the network device and the user equipment. For example, the default subcarrier spacing size is 15 kHz for initial access, or is a largest subcarrier spacing of 60 kHz that is supported by a data channel in a sub 6 GHz scenario.

Optionally, the network device notifies the user equipment of the identifier of the second system parameter by using higher layer or physical layer signaling. The higher layer signaling may include a master information block (MIB), a system information block (SIB), a random access response message (Msg. 2), a message 4 (Msg. 4), and the like. The physical layer signaling may include DCI and the like.

The network device may send the configuration information to the user equipment by using a Uu interface shown in FIG. 1, where the configuration information includes allocation information of frequency domain resources of the plurality of first system parameters, and is used to indicate the frequency domain resources of the plurality of first system parameters.

In a possible implementation, if the subcarrier spacing size of the second system parameter is not the default subcarrier spacing size, the configuration information further includes the identifier of the second system parameter, so that the user equipment divides a system band resource based on the second system parameter.

In a possible implementation, the configuration information further includes identifiers of the plurality of first system parameters, specifically including identifiers of all first system parameters, and different first system parameters are corresponding to different identifiers. In this case, the configuration information is used to indicate allocation information of frequency domain resources corresponding to different first system parameters, and a correspondence between the different first system parameters and the allocation information of the frequency domain resources may be one-to-one. To be specific, different first system parameters occupy different frequency domain resources. A correspondence between different first system parameters and the allocation information of the frequency domain resources may be many-to-one. To be specific, two or more first system parameters may occupy a same frequency domain resource.

In a possible implementation, the configuration information is common-level downlink control information, and a common level may be a cell level or a UE group level. The common-level downlink control information is common downlink control information that a cell user and a user in a UE group need to detect, and is separately located in common search space over a downlink control channel and search space in the UE group.

To further improve accuracy of data received by a receiving party, the receiving party needs to perform error detection before receiving the data. The receiving party actually receives the data only when a detection result indicates that the data is correct. There are a plurality of detection manners. Common manners include a parity check, an Internet check, a cyclic redundancy check (CRC), and the like. In this embodiment of the present invention, the CRC is used to detect the common-level downlink control information. The CRC is a hash function that generates a short check code with fixed bits based on data such as a network data packet or a computer file, and is mainly used to detect or check an error that possibly occurs during data transmission or after data storage.

Optionally, the CRC on the common-level downlink control information is scrambled by using a cell or UE group common identifier. The cell common identifier is common information of users in the cell that is predefined or that is configured by using higher layer signaling, and includes a physical cell identifier (PCI), a hyper-cell identifier, a radio network temporary identifier (RNTI), and the like. The UE group common identifier is common information of users in the UE group.

Optionally, the CRC on the common-level downlink control information is scrambled by using an identifier of the first system parameter. Performing scrambling by using the identifier of the first system parameter can indirectly indicate the identifier of the first system parameter. In the plurality of first system parameters, each first system parameter has a different identifier. The identifier of each first system parameter is corresponding to one piece of common-level downlink control information. To be specific, the CRC on each piece of common-level downlink control information is scrambled by using an identifier of a corresponding first system parameter. In this case, although there is a relatively large amount of the common-level downlink control information, for the user equipment, scrambling can be performed only by using an identifier of a first system parameter supported by the user equipment. There may be one or more first system parameters supported by the user equipment. Because the CRC is scrambled by using the identifier of the first system parameter, in this case, the configuration information does not need to indicate the identifier of the first system parameter again. Therefore, a size of the common-level downlink control information may be reduced, and complexity of blind detection for the UE may be reduced.

Optionally, a frozen bit of the common-level downlink control information is the cell common identifier. In a construction method in which a frozen bit is a polar code, some channels with better channel quality are selected from N channels as information transmission channels, and the remaining channels are used as frozen bit transmission channels, which are generally used to transmit fixed information. During decoding, if there is no correspondence between a frozen bit and a channel, a decoding process may be not convergent. In other words, decoding cannot be performed properly.

Optionally, a frozen bit of the common-level downlink control information is the identifier of the first system parameter. Likewise, a frozen bit of each piece of common-level downlink control information is an identifier of a corresponding first system parameter.

In a possible implementation, the configuration information is higher layer signaling, and the higher layer signaling is carried in dedicated radio resource control (RRC) signaling, a system message, a random access response message (Msg.2), a message 4 (Msg.4), or a MAC control element (MAC CE). When the higher layer signaling is carried in the RRC signaling, for different UEs, configuration information is different. The system message is a public message, similar to a broadcast message. In an LTE system, contention-based random access has four messages Msg. 1 to Msg. 4. The Msg. 2 is a random access response message (Msg.2) that is sent by a base station to UE based on a random access preamble (Msg. 1) sent by the UE. The Msg. 4 is Contention Resolution (Msg. 4) that is sent by the base station to the UE based on Scheduled Transmission Containing (Msg. 1) sent by the UE. The MAC CE is a control element or a control particle at a media access control layer.

The following uses two examples to describe the configuration information, and both of the two examples use the downlink resource allocation type 2 for description. However, in the two examples, RBs instead of VRBs are consecutively allocated.

Figure 3:
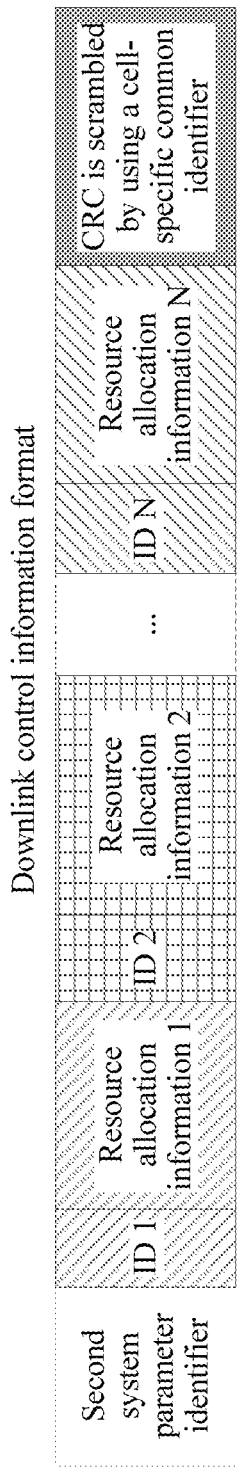
FIG. 3 is a schematic diagram of a downlink control information format according to an embodiment of the present invention.

Example 1: FIG. 3 is a schematic diagram of a downlink control information format according to an embodiment of the present invention. As shown in FIG. 3, a CRC in the DCI format is scrambled by using a cell common identifier.

A first field in FIG. 3 is used to indicate an identifier of the second system parameter. A quantity of bits occupied by the field is $\lceil \log_2 K \rceil$, where K represents a total quantity of first system parameters supported by the network device. A method for reducing overheads is that a value of K is related to a system working frequency. For example, for a working frequency of sub 6 GHz, first system parameters supported by the network device include corresponding subcarrier spacings of 15 kHz, 30 kHz, and 60 kHz, and in this case, the value of K is 3 and the quantity of bits occupied by the field is 2.

A second field in FIG. 3 is an area shown by left slash lines, a third field is an area shown by grid lines, and an $(N+1)^{th}$ field is an area shown by right slash lines. Each of fields from the second field to the $(N+1)^{th}$ field includes two subfields.

The second field is used as an example. A first subfield of the field represents an identifier of a first system parameter corresponding to a first subband. A quantity of bits occupied by the first subfield is $\lceil \log_2 K \rceil$, where K represents a total quantity of first system parameters supported by the network device. A second subfield of the field represents resource allocation information 1 of the first system parameter corresponding to the first subband. A quantity of bits occupied by the second subfield is $\lceil \log_2(N_{RB}^{DL}(N_{RB}^{DL}+1)/2) \rceil$, where $N_{RB}^{DL}$ represents a downlink system bandwidth. The second subfield of the field is a resource indicator value RIV, which is used to represent a start RB ($RB_{start}$) of the first subband and a length ($L_{CRBs}$) of consecutively allocated RBs. In other words, the second subfield indicates the resource allocation information 1 of the first system parameter corresponding to the first subband. Other fields are deduced by analogy, and details are not described herein.

Based on FIG. 3, the configuration information includes an identifier of the first system parameter (an identifier of each first system parameter) and an identifier of the second system parameter, and the CRC of the configuration information is scrambled by using a cell common identifier.

Figure 4:
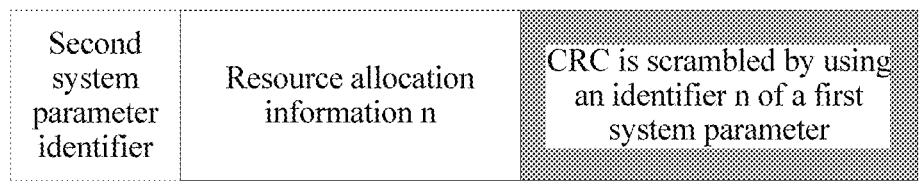
FIG. 4 is a schematic diagram of another downlink control information format according to an embodiment of the present invention.

Example 2: FIG. 4 is a schematic diagram of another downlink control information format according to an embodiment of the present invention. As shown in FIG. 4, a CRC in the DCI format is scrambled by using an identifier n of a first system parameter. The identifier n of the first system parameter may represent an identifier of a first system parameter in a plurality of first system parameters.

A first field in FIG. 4 is used to indicate an identifier of the second system parameter. A quantity of bits occupied by the field is $\lceil \log_2 K \rceil$, where K represents a total quantity of first system parameters supported by the network device. A method for reducing overheads is that a value of K is related to a system working frequency. For example, for a working frequency of sub 6 GHz, first system parameters supported by the network device include corresponding subcarrier spacings of 15 kHz, 30 kHz, and 60 kHz, and in this case, the value of K is 3 and the quantity of bits occupied by the field is 2.

A second field in FIG. 4 is used to indicate resource allocation information n of a first system parameter corresponding to a first subband, and a quantity of bits occupied by the field is $\lceil \log_2(N_{RB}^{DL}(N_{RB}^{DL}+1)/2) \rceil$. The field is a resource indicator value RIV, which is used to indicate a start RB ($RB_{start}$) of the first subband and a length ($L_{CRBs}$) of consecutively allocated RBs. It should be noted that, one piece of DCI is corresponding to one CRC scrambled by using an identifier of a first system parameter, and one DCI is corresponding to one piece of resource allocation information of a first system parameter. The corresponding resource allocation information is determined based on the identifier of the first system parameter in the scrambled CRC.

Based on FIG. 4, the configuration information includes an identifier of the second system parameter, and a CRC of the configuration information is scrambled by using the identifier of the first system parameter.

The resource allocation information in FIG. 3 and FIG. 4 is allocation information of a frequency domain resource, and is consecutive in frequency domain based on the downlink resource allocation type 2. For other resource allocation types, a resource indicated by the resource allocation information varies and is determined based on a specific resource allocation type. The resource may be consecutive or not consecutive in frequency domain.

202. The user equipment receives the configuration information sent by the network device.

Allocation information of a frequency domain resource of the first system parameter, the first system parameter, and the second system parameter are used to determine the frequency domain resource of the first system parameter. In this case, a frequency domain resource of any one of the plurality of first system parameters is determined. By analogy, a frequency domain resource of each first system parameter may be determined, and then frequency domain resources of the plurality of first system parameters may be determined.

The user equipment divides a system frequency domain resource based on the second system parameter. For example, if a subcarrier spacing size corresponding to the second system parameter is 60 kHz, the user equipment divides the system frequency domain resource based on the 60 kHz and numbers the system frequency domain resource from 0 to N−1.

The user equipment determines the frequency domain resource of the first system parameter based on the allocation information of the frequency domain resource of the first system parameter, the first system parameter, and the system frequency domain resource obtained after division based on the second system parameter. In other words, the user equipment determines the frequency domain resource allocated by the network device to the first system parameter. The first system parameter is one of the plurality of first system parameters.

If the configuration information is the common-level downlink control information, when receiving the DCI, the user equipment performs corresponding blind detection based on a scrambling manner of the DCI; or when receiving the DCI, the user equipment performs decoding based on a frozen bit of the DCI.

Based on example 1 shown in FIG. 3, the user equipment blindly detects the DCI by using the cell common identifier, so as to obtain each field shown in FIG. 3. The user equipment determines the second system parameter based on the first field, divides the system frequency domain resource based on the second system parameter and numbers the system frequency domain resource. Identifiers of all first system parameters are represented by a same quantity of bits, namely, $\lceil \log_2^K \rceil$. Therefore, the plurality of first system parameters supported by the network device may be numbered according to a predefined rule, for example, be numbered in ascending order of subcarrier spacings. If 15 kHz, 30 kHz, and 60 kHz are supported, "00" indicates 15 kHz, "01" indicates 30 kHz, and "10" indicates 60 kHz. If the second system parameter is also 60 kHz, the first field is "10".

The user equipment determines an identifier of a first system parameter corresponding to a first subband based on a value of bits $\lceil \log_2^K \rceil$ of the first subfield in the second field, and the user equipment further determines a start RB ($RB_{start}^{ref}$) in the first subband and a length ($L_{CRBs}^{ref}$) of consecutively allocated RBs based on a value of bits $\lceil \log_2 (N_{RB}^{DL}(N_{RB}^{DL}+1)/2) \rceil$ of the second subfield in the second field. In other words, the user equipment determines allocation information of a frequency domain resource of the first system parameter corresponding to the first subband. If $\lfloor RIV/N_{RB}^{DL} \rfloor + RIV \% N_{RB}^{DL} < N_{RB}^{DL}$, $RB_{start}^{ref} = RIV \% N_{RB}^{DL}$ and $L_{CRBs}^{ref} = \lfloor RIV/N_{RB}^{DL} \rfloor + 1$, and vice versa, $RB_{start}^{ref} = N_{RB}^{DL} - RIV \% N_{RB}^{DL} - 1$ and $L_{CRBs}^{ref} = N_{RB}^{DL} - \lfloor RIV/N_{RB}^{DL} \rfloor + 1$.

According to the foregoing method, the user equipment determines identifiers of the first system parameters corresponding to a second subband, a third subband, and the like respectively based on a third field, a fourth field, and the like, and determines a respective start RB of each subband and a length of consecutively allocated RBs.

The user equipment calculates start RBs ($RB_{start}$) and lengths ($RB_{start}$) of consecutively allocated RBs of the first system parameters corresponding to all subbands based on identifiers of the first system parameters corresponding to all the subbands. For example, if a subcarrier spacing of the second system parameter is 60 kHz and a subcarrier spacing corresponding to a first system parameter used by a subband is 30 kHz, $RB_{start} = 2RB_{start}^{ref}$ and $L_{CRBs} = 2L_{CRBs}^{ref}$.

Figure 5:
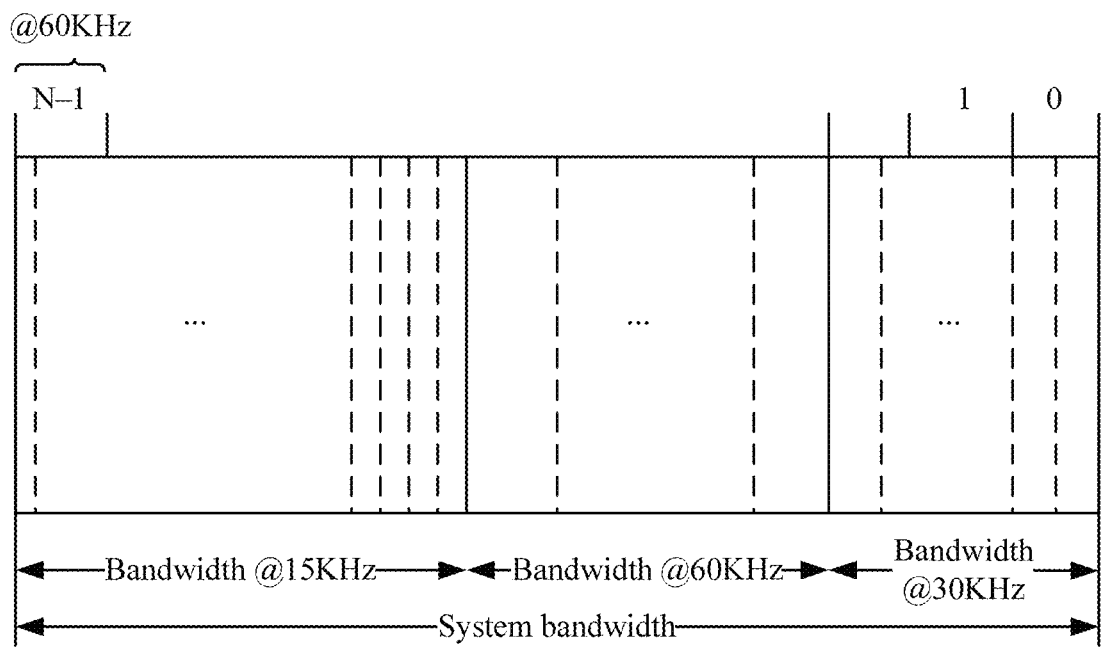
FIG. 5 is a schematic diagram of frequency band division information obtained by user equipment based on FIG. 3.

FIG. 5 is a schematic diagram of frequency band division information obtained by user equipment based on FIG. 3. The frequency band allocation information separately indicates allocation information of a frequency domain resource of a first system parameter corresponding to subcarrier spacings of 15 kHz, 60 kHz, and 30 kHz, and the subcarrier spacing of the second system parameter is 60 kHz.

Based on example 2 shown in FIG. 4, the user equipment blindly detects DCI by using the identifier of the first system parameter supported by the user equipment. The user equipment can blindly detect the DCI properly only when the identifier of the first system parameter required by the user equipment is the same as the identifier of the first system parameter corresponding to the second field, so as to obtain the fields shown in FIG. 4. The user equipment determines the second system parameter based on the first field, divides the system frequency domain resource based on the second system parameter and numbers the system frequency domain resource. In the case of proper blind detection, the user equipment determines allocation information of a frequency domain resource of a first system parameter supported by the user equipment based on the second field.

Figure 6:
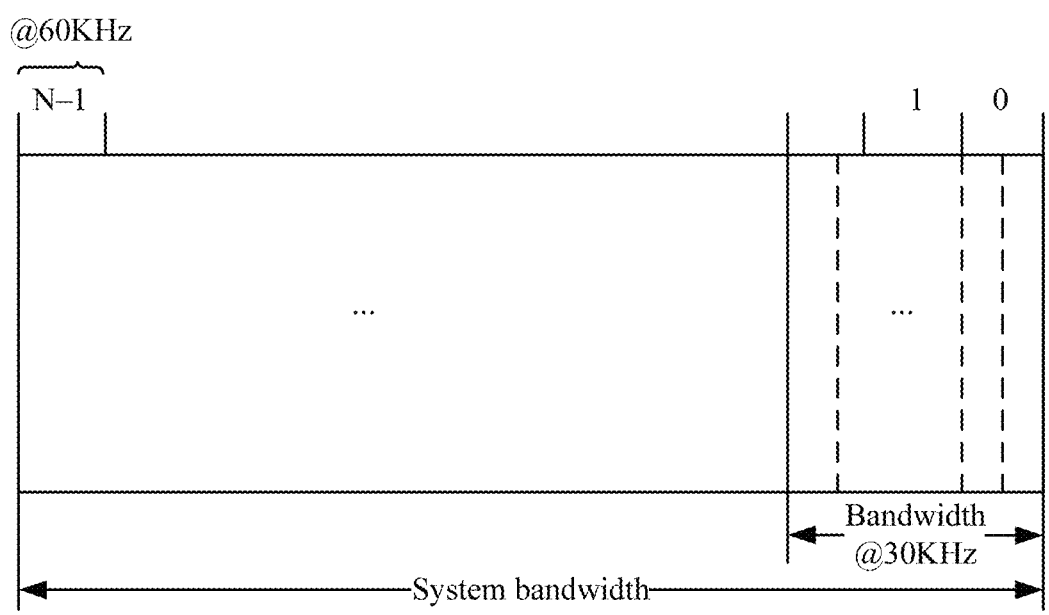
FIG. 6 is a schematic diagram of frequency band division information obtained by user equipment based on FIG. 4.

FIG. 6 is a schematic diagram of frequency band division information obtained by user equipment based on FIG. 4. A subcarrier spacing of the second system parameter is 60 kHz, a subcarrier spacing size of a first system parameter supported by the user equipment is 30 kHz, and the user equipment obtains only a start RB of a subband corresponding to 30 kHz and a length of consecutively allocated RBs. If there is no extra signaling indication, the user equipment considers other frequency bands as blank resources.

Compared with example 1, DCI in example 2 is relatively small, and can reduce complexity of blind detection for the UE to some extent. If the UE needs to obtain allocation information of a frequency domain resource of another first system parameter, the UE needs to attempt identifiers of a plurality of first system parameters, and a quantity of detection times increases to some extent.

The user equipment may determine frequency domain resources of one or more first system parameters based on a requirement. For example, for FIG. 5, the user equipment may determine frequency domain resources of the plurality of first system parameters, and for FIG. 6, the user equipment may determine a frequency domain resource of a first system parameter supported by the user equipment, and there may be one or more first system parameters supported by the user equipment.

203. The user equipment transmits information corresponding to a physical channel and/or information corresponding to a physical signal on at least one resource element in a time-frequency resource corresponding to a frequency domain resource of at least one of the plurality of first system parameters.

After determining the frequency domain resource of the at least one first system parameter, the user equipment transmits the information corresponding to the physical channel and/or the information corresponding to the physical signal on the at least one resource element in the time-frequency resource corresponding to the frequency domain resource. For the frequency domain resource of the at least one first system parameter, it should be understood that, for FIG. 6, if the user equipment supports one first system parameter, the frequency domain resource of the at least one first system parameter is a frequency domain resource corresponding to the first system parameter, and if the user equipment supports two or more first system parameters, the frequency domain resource of the at least one first system parameter is frequency domain resources corresponding to the two or more first system parameters; for FIG. 5, the frequency domain resource of the at least one first system parameter is frequency domain resources corresponding to the plurality of first system parameters.

Generally, one subframe includes two slots, and one slot includes seven symbols. One resource block (RB) includes 12 subcarriers in frequency domain and one slot in time domain, and one RB includes 7×12=84 REs. A horizontal direction of the RE represents time domain resources, and a vertical direction of the RE represents frequency domain resources. After determining the frequency domain resource corresponding to the at least one first system parameter, the user equipment determines a time-frequency resource corresponding to the at least one first system parameter based on the frequency domain resource corresponding to the at least one first system parameter. In this case, the time-frequency resource corresponding to the at least one first system parameter includes at least one resource element.

The user equipment performs uplink or downlink information transmission on the at least one resource element. The information may be the information corresponding to the physical channel, may be the information corresponding to the physical signal, or may be the information corresponding to the physical channel and the information corresponding to the physical signal.

A resource element corresponding to the physical channel is used to carry information from a higher layer, and the physical channel may include a physical uplink/downlink control channel, a physical uplink/downlink shared channel, a physical random access channel, a physical broadcast channel, and a physical multicast channel.

A resource element corresponding to the physical signal is used for physical layer transmission, and does not carry the information from the higher layer. The physical signal may include a reference signal, a synchronization signal, and a discovery signal.

Optionally, when blindly detecting or decoding corresponding frequency domain resource allocation information by using a first system parameter supported by the user equipment, the user equipment determines a corresponding frequency domain resource, and transmits the information corresponding to the physical channel and/or the information corresponding to the physical signal on at least one resource element of a time-frequency resource corresponding to the frequency domain resource.

In the embodiments of the present invention, the network device sends, to the user equipment, the configuration information that includes the allocation information of the frequency domain resources of the plurality of first system parameters, so as to indicate the frequency domain resources corresponding to the plurality of first system parameters, so that the user equipment transmits the information corresponding to the physical channel and/or the information corresponding to the physical signal on at least one resource element of a time-frequency resource corresponding to a required frequency domain resource, and the resource allocation status in the co-existence scenario of the plurality of system parameters is indicated.

In the LTE system, dynamic scheduling of RB resources is implemented on an eNB side, and "RB resources" herein are actually VRBs (Virtual RBs) rather than PRBs. There is a different mapping relationship between the VRB and the PRB. The simplest mapping relationship is that a location of the VRB is the same as a location of the PRB, and there is a one-to-one correspondence between the location of the VRB and the location of the PRB. Another relatively complex relationship is that there is no one-to-one correspondence between the VRB and the PRB, but the location of the PRB can be explicitly deduced by using the VRB depending on a specific mapping relationship. The former simple relationship of one-to-one correspondence is centralized resource allocation, whereas the latter relatively complex mapping relationship is distributed resource allocation.

When scheduling a resource, the eNB side may use different allocation manners based on different scenarios. The centralized resource allocation can improve a rate of UE and a throughput of an entire cell, and the distributed resource allocation can improve transmission reliability.

A downlink VRB has two resource mapping manners: a centralized VRB resource mapping manner and a distributed VRB resource mapping manner. In the centralized resource mapping manner, a VRB pair and a PRB pair are in a one-to-one correspondence. In other words, the location of the VRB is the location of the PRB. An RB resource block sequence number $n_{PRB}=n_{VRB}$, ranging from 0 to $N_{RB}^{DL}-1$. FIG. 7a is a location relationship between the PRB and the VRB when a VRB resource is allocated in a centralized manner in a bandwidth of 5 MHz.

Figure 7:
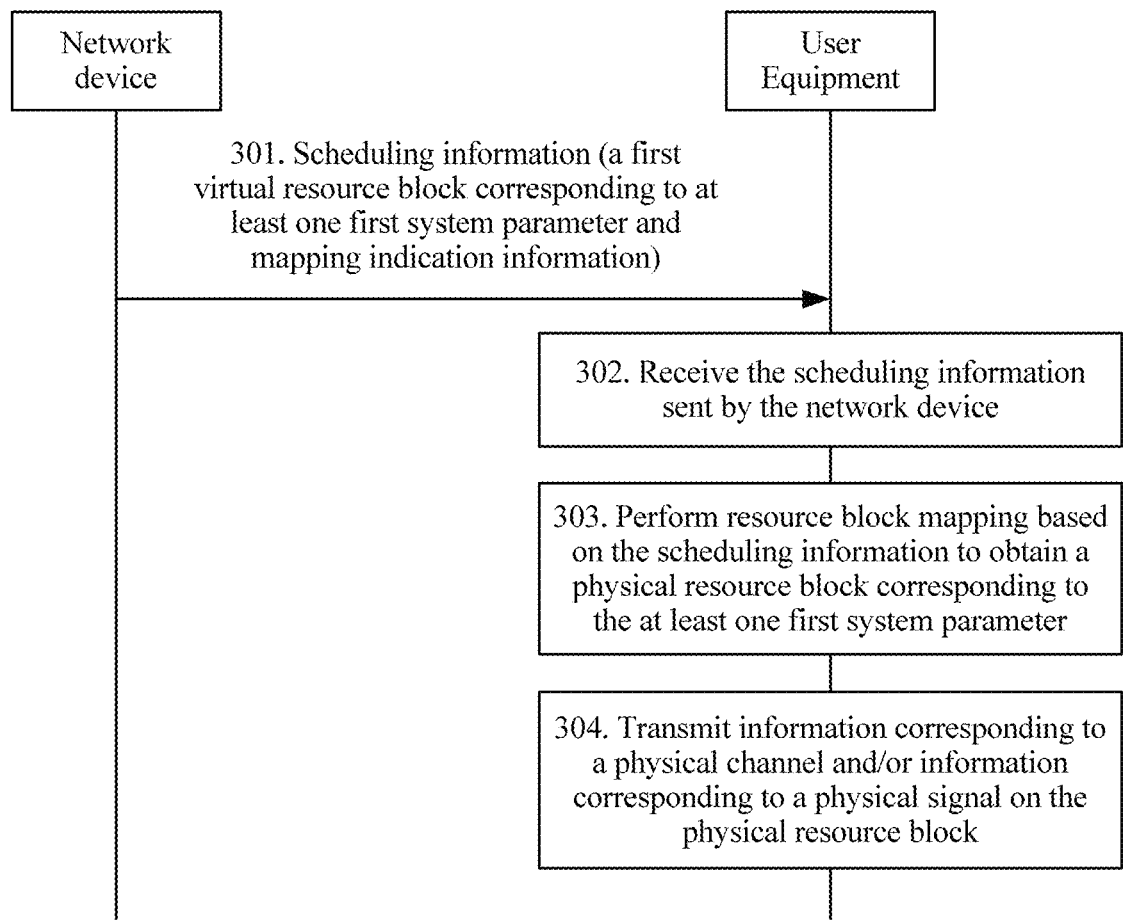
FIG. 7 is a schematic flowchart of a method for mapping a virtual resource block to a physical resource block according to an embodiment of the present invention.
Figure 7A:
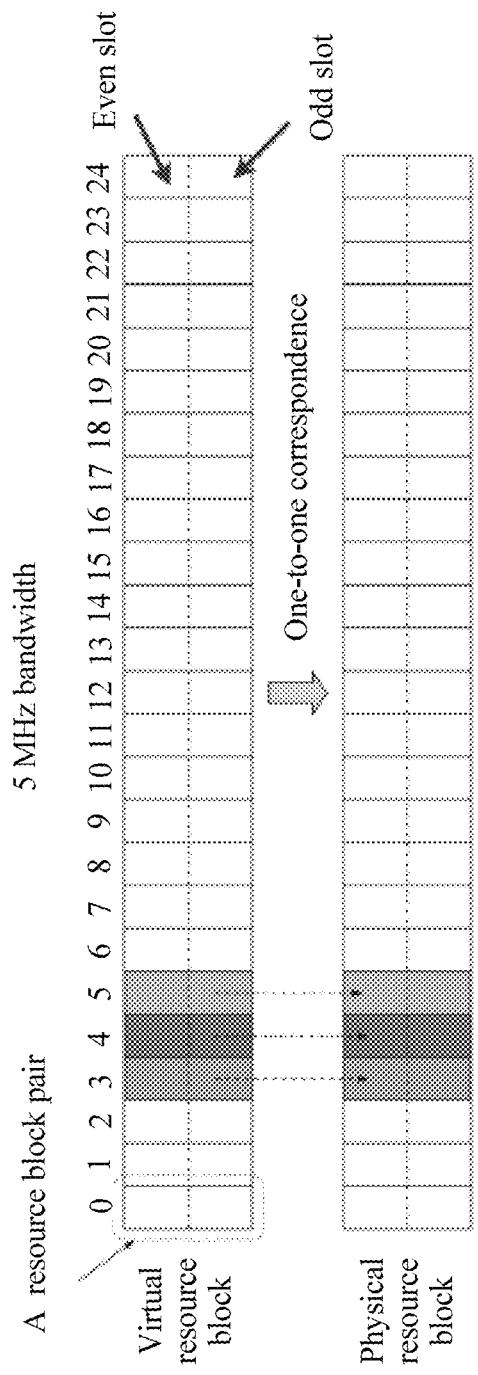
FIG. 7a is a schematic diagram of a centralized resource allocation process in which a downlink bandwidth is 5 MHz.
Figure 7B:
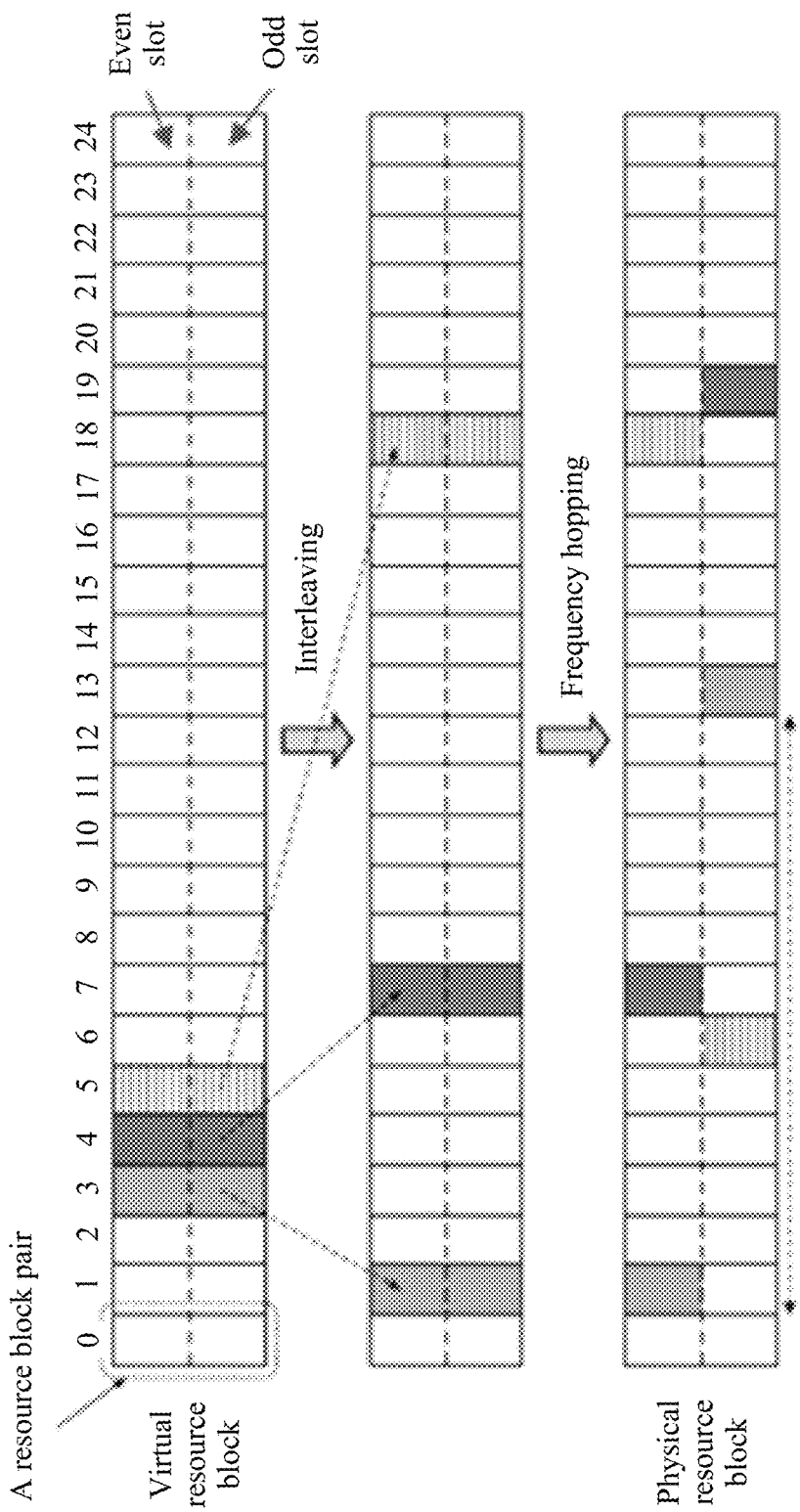
FIG. 7b is a schematic diagram of a distributed resource allocation process in which a downlink bandwidth is 5 MHz.

In the distributed resource mapping manner, the VRB pair and the PRB pair are not in a one-to-one correspondence, the consecutive VRB sequence numbers are mapped to nonconsecutive PRB sequence numbers, and two slots in one subframe have different mapping relationships (as shown in FIG. 7b). By using this method, "distributed" resource allocation is achieved. Regardless of whether the consecutive VRB pairs are mapped to the nonconsecutive PRB pairs, or each PRB pair is separated and two RB resources of one PRB pair are transmitted at a specific frequency spacing (which may be considered as slot-based frequency hopping), the purpose is to achieve a diversity effect in frequency.

FIG. 7b is a schematic diagram of a distributed resource allocation process in which a downlink bandwidth is 5 MHz. The diagram is used merely to help understand a distributed process, and does not represent that an actual mapping location of the PRB is the same as that shown in FIG. 7b. The diagram is simple and intuitive, and can describe this process well. The following specifically describes this mapping relationship from a protocol perspective, or how to obtain the actual mapping location of the PRB pair from the VRB pair.

Step 1: Interleaving includes: (1) determining a value of $N_{gap}$, a value of P, and a quantity of VRB pairs, where $N_{gap}$ is used to indicate a frequency offset between an RB pair, this value is measured in a unit of a quantity of RBs, and varies with a system bandwidth, and once the system bandwidth is determined, this value is determined; P is used to indicate a size of an RBG, where the value of P is related to the system bandwidth; (2) determining a VRB interleaving matrix: "horizontal placement"; and (3) determining the PRB corresponding to the VRB: "column fetching".

Step 2: Frequency hopping between slots includes: for a same VRB number, an RB in an odd slot is offset by $N_{VRB}/2$ in the VRB interleaving unit on the basis of an even slot.

Selection of parameters in the distributed mapping from the VRB to the PRB depends on the system bandwidth. In a co-existence scenario of a plurality of system parameters, because different subcarrier spacings indicate different OFDM symbol frequency domain widths, the RBs cannot be numbered uniformly. In this case, using the foregoing distributed mapping causes a disorder of RB numbers corresponding to different system parameters. An intuitive solution is that the foregoing distribution is performed only within the bandwidth occupied by the same system parameter, and is not performed across system parameters. However, the UE needs to clearly know a frequency domain resource location corresponding to each system parameter, including a frequency domain start RB and a frequency domain width.

In view of this, the embodiments of the present invention provide the method for mapping a virtual resource block to a physical resource block, the network device, and the user equipment, which are applicable to the co-existence scenario of the plurality of system parameters, and can indicate resource allocation in the co-existence scenario of the plurality of system parameters.

It should be noted that, the mapping method is a detailing process of step 203 in the embodiment shown in FIG. 2.

FIG. 7 is a schematic communication diagram of a method for mapping a virtual resource block to a physical resource block according to an embodiment of the present invention. The method includes step 301 and step 302.

301. A network device sends scheduling information to user equipment, where the scheduling information includes a first virtual resource block corresponding to at least one first system parameter and mapping indication information.

For explanation of the at least one first system parameter, refer to corresponding explanation in step 203, and details are not described herein again.

The scheduling information may be DCI, and a format of the DCI includes a mapping manner indication bit. The bit indicates the mapping indication information, and is used to instruct the user equipment to perform resource block mapping in an indicated mapping manner. The indicated mapping manner may be centralized mapping or new distributed mapping, and the new distributed mapping is first distributed mapping and then centralized mapping.

Figure 8:
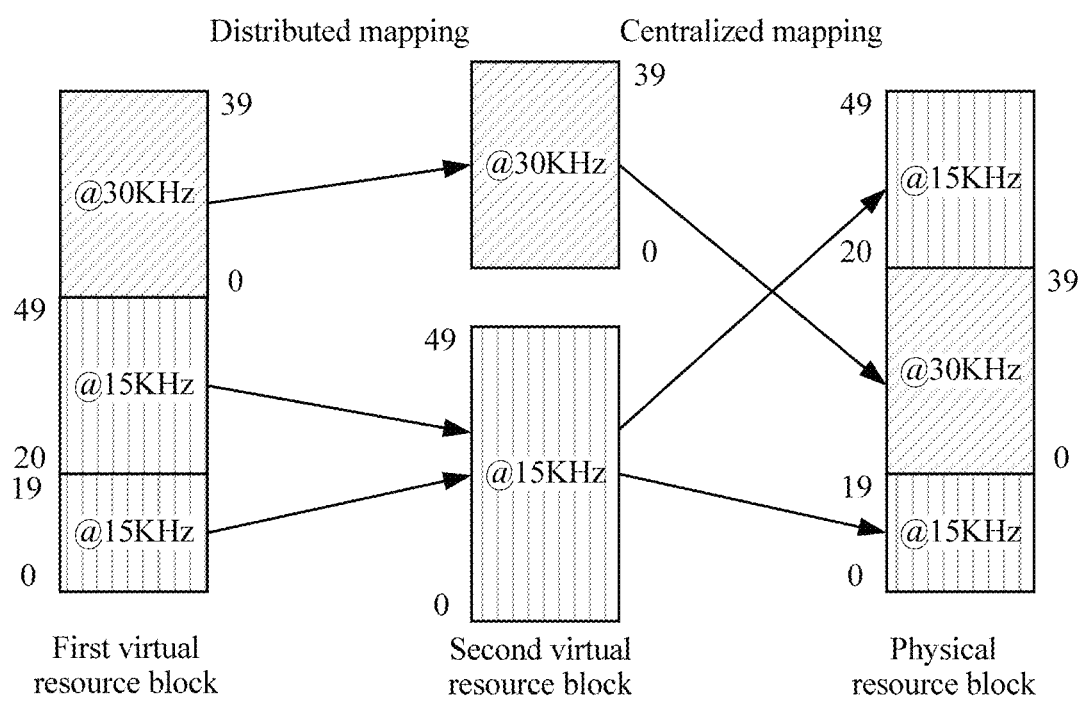
FIG. 8 is a schematic diagram of example mapping according to the embodiment shown in FIG. 7.

The first virtual resource block corresponding to the at least one first system parameter includes numbers of the first virtual resource blocks corresponding to all first system parameters. FIG. 8 is a schematic diagram of example mapping according to the embodiment shown in FIG. 7. The at least one first system parameter includes two first system parameters corresponding to a subcarrier spacing of 15 kHz and a first system parameter corresponding to a subcarrier spacing of 30 kHz. Numbers of the first virtual resource blocks corresponding to the two first system parameters corresponding to the subcarrier spacing of 15 kHz are respectively 0 to 19 and 20 to 49, and numbers of the first virtual resource blocks corresponding to the first system parameter corresponding to the subcarrier spacing of 30 kHz are 0 to 39.

302. The user equipment receives the scheduling information sent by the network device.

303. The user equipment performs resource block mapping based on the scheduling information to obtain a physical resource block corresponding to the at least one first system parameter.

Specifically, if a mapping manner indicated by the mapping indication information is centralized mapping, the user equipment maps the first virtual resource blocks corresponding to all first system parameters to corresponding physical resource blocks in the centralized mapping manner and based on numbers of the first virtual resource blocks corresponding to all the first system parameters.

If the mapping manner indicated by the mapping indication information is new distributed mapping, the user equipment first maps the first virtual resource blocks corresponding to all the first system parameters to a second virtual resource block in a distributed mapping manner. To be specific, $n_{VRB,2}=M(n_{VRB,1})$, where M represents the distributed mapping manner, including at least one of interleaving and frequency hopping between slots, $n_{VRB,1}$ represents the number of the first virtual resource block, a value of $n_{VRB,1}$ is 0 to $N_{VRB,1}-1$, $N_{VRB,1}=N_{RB}$, and $N_{RB}$ is a quantity of RBs occupied by a given first system parameter in frequency domain of a time-frequency resource. As shown in FIG. 8, numbers of the first virtual resource blocks corresponding to the first system parameter with a subcarrier spacing size of 30 kHz are 0 to 39, and a quantity of occupied RBs is 40. $n_{VRB,2}$ indicates a number of the second virtual resource block. As shown in FIG. 8, numbers of the first virtual resource blocks corresponding to the first system parameter with a subcarrier spacing size of 30 kHz are 0 to 39, and numbers of the mapped second virtual resource blocks are 0 to 39. Numbers of the first virtual resource blocks corresponding to the two first system parameters with a subcarrier spacing size of 15 kHz are respectively 0 to 19 and 20 to 49, and numbers of the mapped second virtual resource blocks are consecutive numbers from 0 to 49.

Then, the user equipment maps the second virtual resource blocks corresponding to all the first system parameters to the physical resource block in the centralized mapping manner, to be specific, $n_{PRB}=n_{VRB,2}$. As shown in FIG. 8, physical resource blocks corresponding to two first system parameters with a subcarrier spacing size of 15 kHz are not consecutive and are uniformly numbered 0 to 49. Numbers of the physical resource blocks corresponding to the first system parameter with a subcarrier spacing size of 30 kHz are 0 to 39.

It should be noted that, step 303 is performed within a segment of bandwidth. The bandwidth may be a system bandwidth, or may be a segment of consecutive bandwidths within the system bandwidth, or may be a segment of consecutive bandwidths that is formed by connecting a plurality of segments of consecutive bandwidths in a manner from a low frequency to a high frequency.

304. The user equipment transmits information corresponding to a physical channel and/or information corresponding to a physical signal on the physical resource block.

The user equipment transmits the information corresponding to the physical channel and/or the information corresponding to the physical signal on some or all resource blocks of the physical resource blocks.

In this embodiment of the present invention, mapping may be performed in a manner of combining a distributed mapping manner and a centralized mapping manner. This is applicable to a co-existence scenario of at least one system parameter, and can indicate resource allocation in the co-existence scenario of the at least one system parameter.

Figure 9A:
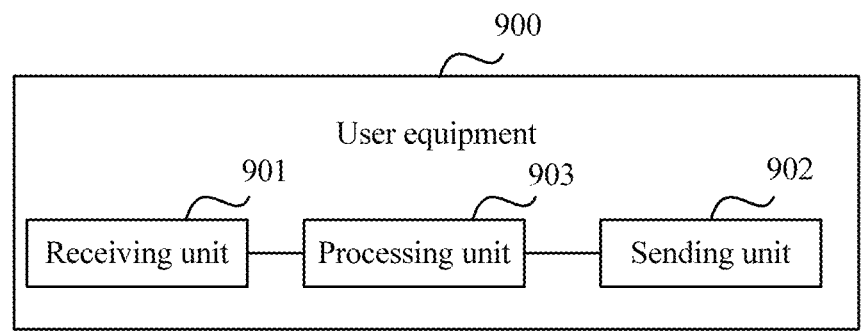
FIG. 9a is a schematic structural diagram of user equipment according to an embodiment of the present invention.

FIG. 9a is a schematic structural diagram of user equipment according to an embodiment of the present invention. The user equipment 900 includes a receiving unit 901 and a sending unit 902.

The receiving unit 901 is configured to receive configuration information sent by a network device, where the configuration information includes allocation information of frequency domain resources of a plurality of first system parameters.

The sending unit 902 is further configured to transmit information corresponding to a physical channel and/or information corresponding to a physical signal on at least one resource element in a time-frequency resource corresponding to a frequency domain resource of at least one of the plurality of first system parameters.

The first system parameter includes at least one of parameters such as a first subcarrier spacing size, a cyclic prefix length, a transmission time interval length, a symbol length, and a symbol quantity.

In a possible implementation, the frequency domain resource of the first system parameter is determined by allocation information of the frequency domain resource of the first system parameter, the first system parameter, and a second system parameter, where the second system parameter includes a second subcarrier spacing size.

In a possible implementation, the plurality of first system parameters are system parameters supported by the network device, and the second system parameter is a reference system parameter for dividing a system frequency domain resource.

In a possible implementation, the configuration information further includes an identifier of the second system parameter.

In a possible implementation, the configuration information further includes an identifier of the first system parameter.

In a possible implementation, the configuration information is common-level downlink control information, and a cyclic redundancy check on the common-level downlink control information is scrambled by using a cell common identifier, or a frozen bit of the common-level downlink control information is the cell common identifier.

In a possible implementation, the configuration information is common-level downlink control information, and a cyclic redundancy check on the common-level downlink control information is scrambled by using an identifier of the first system parameter, or a frozen bit of the common-level downlink control information is the identifier of the first system parameter.

In a possible implementation, the configuration information is higher layer signaling, and the higher layer signaling is carried in dedicated radio resource control signaling, a system message, a random access response message, a message 4, or a media access control element.

It should be noted that, the receiving unit 901 is configured to perform step 202 in the embodiment shown in FIG. 2, and is further configured to perform step 302 in the embodiment shown in FIG. 7. The sending unit 902 is configured to perform step 203 in the embodiment shown in FIG. 2, and is further configured to perform step 304 in the embodiment shown in FIG. 7. The user equipment 900 further includes a processing unit 903, configured to perform step 303 in the embodiment shown in FIG. 7.

The processing unit 903 may be a processor or a controller, for example, may be a central processing unit (CPU), a general-purpose processor, a digital signal processor (DSP), an application-specific integrated circuit (ASIC), a field programmable gate array (FPGA), or another programmable logic device, a transistor logic device, a hardware component, or any combination thereof. The controller/processor may implement or execute various example logical blocks, modules, and circuits described with reference to content disclosed in the present invention. Alternatively, the processor may be a combination of processors implementing a computing function, for example, a combination of one or more microprocessors, or a combination of the DSP and a microprocessor. The receiving unit 901 and the sending unit 902 may be a transceiver, a transceiver circuit, a communications module, or the like.

Figure 9B:
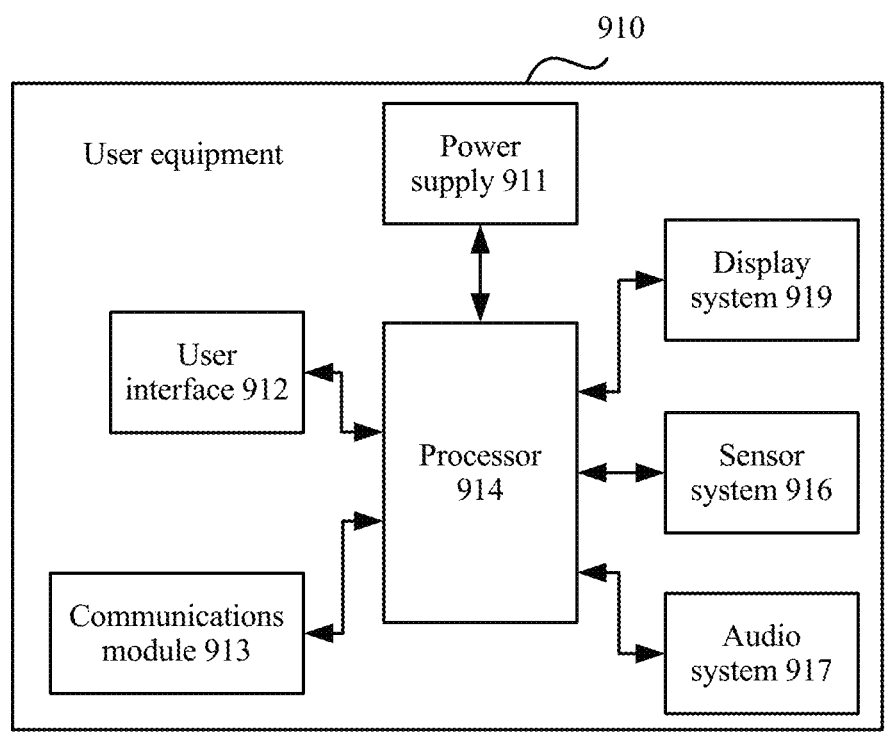
FIG. 9b is a schematic structural diagram of user equipment according to an embodiment of the present invention.

When the processing unit 902 is a processor, and the receiving unit 901 and the sending unit 902 are communications modules, the user equipment in the embodiments of the present invention may be user equipment shown in FIG. 9b.

Referring to FIG. 9b, the user equipment 910 includes a power supply 911, a user interface 912, a communications module 913, a processor 914, a display system 919, a sensor system 916, and an audio system 917. It should be noted that, the user equipment 910 may represent the user equipment in FIG. 1, or may represent an electronic device such as a motor vehicle, a non-motor vehicle, another communications device on a road, or an intelligent household appliance. A structure of the user equipment shown in FIG. 9b does not constitute a limitation on the embodiments of the present invention.

The power supply 911 supplies electric power for implementing various functions of the user equipment 910. The user interface 912 is configured to connect the user equipment 910 to another device or apparatus, so as to implement communication or data transmission between the another device or apparatus and the user equipment 910. The communications module 913 is configured to implement communication or data transmission between the user equipment 910 and a network device such as a base station or a satellite, and is further configured to implement communication or data transmission between the user equipment 910 and another user equipment. Being applied to this embodiment of the present invention, the communications module 913 is configured to implement functions of the receiving unit 901 and the sending unit 902 shown in FIG. 9a. The processor 914 may implement or execute various example logical blocks, modules, and circuits described with reference to content disclosed in the present invention. Being applied to this embodiment of the present invention, the processor 914 is configured to implement a function of the processing unit 903 shown in FIG. 9a. The display system 919 is configured to output and display information and receive a user-input operation. The sensor system 916 includes various sensors, such as a temperature sensor or a distance sensor. The audio system 917 is configured to output an audio signal.

Figure 10A:
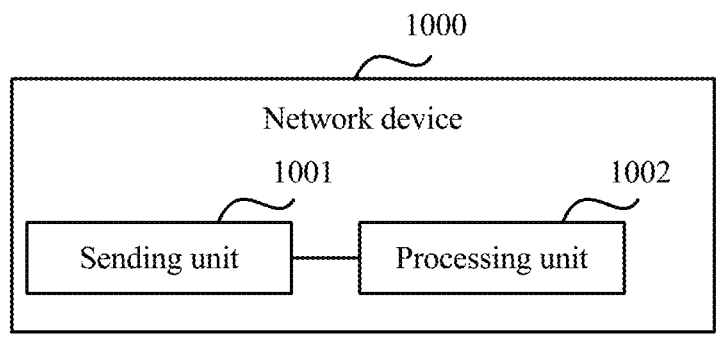
FIG. 10a is a schematic structural diagram of a network device according to an embodiment of the present invention.

FIG. 10a is a schematic structural diagram of a network device according to an embodiment of the present invention. The network device 1000 includes a sending unit 1001.

The sending unit 1001 is configured to send configuration information to user equipment, where the configuration information includes allocation information of frequency domain resources of a plurality of first system parameters, and at least one resource element in a time-frequency resource corresponding to a frequency domain resource of at least one of the plurality of first system parameters is used by the user equipment to transmit information corresponding to a physical channel and/or information corresponding to a physical signal.

The first system parameter includes at least one of parameters such as a first subcarrier spacing size, a cyclic prefix length, a transmission time interval length, a symbol length, and a symbol quantity.

The network device 1000 further includes a processing unit 1002, configured to allocate frequency domain resources to the plurality of first system parameters, to obtain allocation information of the frequency domain resources of the plurality of first system parameters.

It should be noted that, the sending unit 1001 is configured to perform step 201 in the embodiment shown in FIG. 2, and is further configured to perform step 301 in the embodiment shown in FIG. 7.

The processing unit 1002 may be a processor or a controller, for example, may be a CPU, a general-purpose processor, a DSP, an ASIC, an FPGA, or another programmable logic device, a transistor logic device, a hardware component, or any combination thereof. The controller/processor may implement or execute various example logical blocks, modules, and circuits described with reference to content disclosed in the present invention. Alternatively, the processor may be a combination of processors implementing a computing function, for example, a combination of one or more microprocessors, or a combination of the DSP and a microprocessor. The sending unit 1001 may be a transceiver, a transceiver circuit, a communications interface, or the like.

Figure 10B:
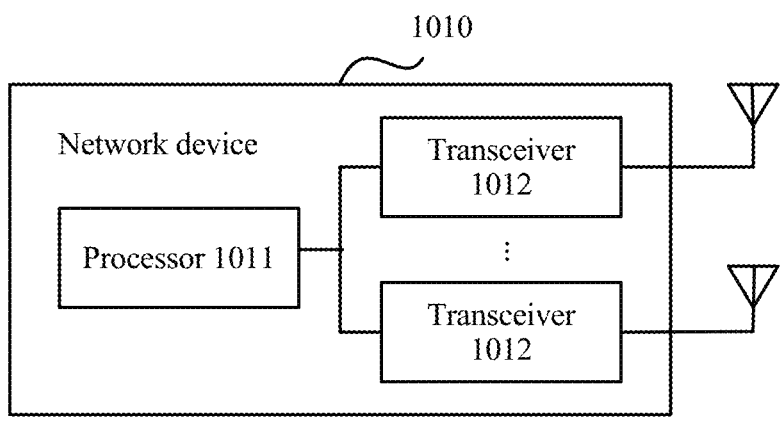
FIG. 10b is a schematic structural diagram of another network device according to an embodiment of the present invention.

When the processing unit 1002 is a processor and the sending unit 1001 is a transceiver, the network device in this embodiment of the present invention may be a network device shown in FIG. 10*b*.

Referring to FIG. 10*b*, the network device 1010 includes a processor 1011, a transceiver 1012, and an antenna. It should be noted that, in actual application, a quantity of the transceivers 1012 is not limited to two, a quantity of the antennas is also not limited to two, and a structure of the network device 1010 does not constitute a limitation on the embodiments of the present invention.

The processor 1011 mainly includes four components: a cell controller, a voice channel controller, a signaling channel controller, and a multi-path interface used for extension. The processor 1011 is responsible for management of all mobile communications interfaces, which is mainly allocation, release, and management of a radio channel. Being applied to this embodiment of the present invention, the processor 1011 is configured to implement a function of the processing unit 1002 shown in FIG. 10*a*. The transceiver 1012 includes a receiver and a transmitter. For user equipment, the transceiver may transmit uplink data by using the transmitter and receive downlink data by using the receiver. Being applied to this embodiment of the present invention, the transceiver 1012 is configured to implement a function of the sending unit 1001 shown in FIG. 10*a*.

An embodiment of the present invention further provides a resource indication system, including the user equipment shown in FIG. 9*a* and the network device shown in FIG. 10*a*, or the user equipment shown in FIG. 9*b* and the network device shown in FIG. 10*b*.

In the foregoing embodiments, the description of each embodiment has respective focuses. For a part that is not described in detail in an embodiment, refer to related descriptions in other embodiments.

A person of ordinary skill in the art may understand that all or some of the processes of the methods in the embodiments may be implemented by a computer program requesting related hardware. The program may be stored in a computer readable storage medium. When the program runs, the processes of the methods in the embodiments are performed. The foregoing storage medium may include: a magnetic disk, an optical disc, a read-only memory (ROM), or a random access memory (RAM).

What is disclosed above is merely embodiments of the present invention, and certainly is not intended to limit the protection scope of the present invention. Therefore, equivalent variations made in accordance with the claims of the present invention shall fall within the scope of the present invention.

What is claimed is:

1. A method comprising:
   receiving, by user equipment, configuration information sent by a network device, wherein the configuration information comprises allocation information of frequency domain resources of a plurality of first system parameters, and wherein a cyclic redundancy check field of the configuration information is scrambled using an identifier of a first system parameter of the plurality of first system parameters; and
   transmitting, by the user equipment, information corresponding to a physical channel and/or information corresponding to a physical signal on at least one resource element in a time-frequency resource corresponding to a frequency domain resource of at least one of the plurality of first system parameters,
   wherein the first system parameter comprises a first subcarrier spacing size, a cyclic prefix length, a transmission time interval length, a symbol length, or a symbol quantity.

2. The method according to claim 1, wherein a frequency domain resource of the first system parameter is determined by allocation information of the frequency domain resource of the first system parameter, the first system parameter, and a second system parameter, and wherein the second system parameter comprises a second subcarrier spacing size.

3. The method according to claim 2, wherein the plurality of first system parameters are system parameters supported by the network device, and wherein the second system parameter is a reference system parameter for dividing a system frequency domain resource.

4. The method according to claim 1, wherein the configuration information further comprises an identifier of a second system parameter.

5. The method according to claim 1, wherein the configuration information further comprises the identifier of the first system parameter.

6. The method according to claim 5, wherein the configuration information comprises common-level downlink control information.

7. The method according to claim 1, wherein the configuration information comprises common-level downlink control information, and wherein a frozen bit of the common-level downlink control information is the identifier of the first system parameter.

8. The method according to claim 1, wherein the configuration information comprises higher layer signaling, and wherein the higher layer signaling is carried in dedicated radio resource control signaling, a system message, a random access response message, a message 4, or a media access control element.

9. User equipment comprising:
   a receiver configured to receive configuration information sent by a network device, wherein the configuration information comprises allocation information of frequency domain resources of a plurality of first system parameters, and a cyclic redundancy check field of the configuration information is scrambled using an identifier of a first system parameter of the plurality of first system parameters; and
   a transmitter configured to transmit information corresponding to a physical channel and/or information corresponding to a physical signal on at least one resource element in a time-frequency resource corresponding to a frequency domain resource of at least one of the plurality of first system parameters,
   wherein the first system parameter comprises a first subcarrier spacing size, a cyclic prefix length, a transmission time interval length, a symbol length, or a symbol quantity.

10. The user equipment according to claim 9, wherein a frequency domain resource of the first system parameter is determined by allocation information of the frequency domain resource of the first system parameter, the first system parameter, and a second system parameter, and wherein the second system parameter comprises a second subcarrier spacing size.

11. The user equipment according to claim 9, wherein the plurality of first system parameters are system parameters supported by the network device, and wherein a second system parameter is a reference system parameter for dividing a system frequency domain resource.

12. The user equipment according to claim 9, wherein the configuration information further comprises an identifier of a second system parameter.

13. The user equipment according to claim 9, wherein the configuration information further comprises the identifier of the first system parameter.

14. The user equipment according to claim 13, wherein the configuration information comprises common-level downlink control information.

15. The user equipment according to claim 9, wherein the configuration information is common-level downlink control information, and wherein a frozen bit of the common-level downlink control information is the identifier of the first system parameter.

16. The user equipment according to claim 9, wherein the configuration information is higher layer signaling, and wherein the higher layer signaling is carried in dedicated radio resource control signaling, a system message, a random access response message, a message 4, or a media access control (MAC) control element.

17. User equipment comprising:
a processor; and
a non-transitory memory storing programming for execution by the processor, the programming including instructions for:

receiving configuration information sent by a network device, wherein the configuration information comprises allocation information of frequency domain resources of a plurality of first system parameters, and wherein a cyclic redundancy check field of the configuration information is scrambled using an identifier of a first system parameter of the plurality of first system parameters; and transmitting information corresponding to a physical channel and/or information corresponding to a physical signal on at least one resource element in a time-frequency resource corresponding to a frequency domain resource of at least one of the plurality of first system parameters, wherein the first system parameter comprises a first subcarrier spacing size, a cyclic prefix length, a transmission time interval length, a symbol length, or a symbol quantity.

18. The user equipment according to claim 17, wherein a the frequency domain resource of the first system parameter is determined by allocation information of the frequency domain resource of the first system parameter, the first system parameter, and a second system parameter, and wherein the second system parameter comprises a second subcarrier spacing size.

19. The user equipment according to claim 17, wherein the plurality of first system parameters are system parameters supported by the network device, and wherein a second system parameter is a reference system parameter for dividing a system frequency domain resource.

20. The user equipment according to claim 17, wherein the configuration information comprises common-level downlink control information.

* * * * *